United States Patent
Toyota et al.

(10) Patent No.: US 6,490,137 B1
(45) Date of Patent: Dec. 3, 2002

(54) INFORMATION EQUIPMENT WITH POLYMER FILM IN BEARING AND DISK

(75) Inventors: Hiroshi Toyota, Osaka (JP); Kazunori Hayashida, Osaka (JP); Hiroaki Takebayashi, Osaka (JP); Terukazu Karashima, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/381,516

(22) PCT Filed: Mar. 24, 1998

(86) PCT No.: PCT/JP98/01270

§ 371 (c)(1),
(2), (4) Date: Sep. 21, 1999

(87) PCT Pub. No.: WO98/43245

PCT Pub. Date: Oct. 1, 1998

(30) Foreign Application Priority Data

Mar. 25, 1997 (JP) ............................................. 9-071647
Mar. 25, 1997 (JP) ............................................. 9-071648

(51) Int. Cl.[7] ............................................. G11B 21/16
(52) U.S. Cl. .................... 360/265.2; 360/135; 428/64.6
(58) Field of Search ........................... 360/294.6, 294.3, 360/294.5, 98.07, 98.04, 99.08, 99.09, 99.11, 282, 265.2, 265.3, 265.4, 265.5, 265.6; 384/462, 463, 464, 468, 469, 477, 527, 155, 93; 361/685; 310/262; 369/266; 528/70; 525/199; 508/106; 411/428; 29/896.03

(56) References Cited

U.S. PATENT DOCUMENTS

| | | | | |
|---|---|---|---|---|
| 4,639,389 A | * | 1/1987 | Nishimatsu et al. | 428/141 |
| 5,208,293 A | * | 5/1993 | Oki et al. | 525/199 |
| 5,388,020 A | * | 2/1995 | Nakamura et al. | 360/135 |
| 5,602,700 A | * | 2/1997 | Viskochil et al. | 360/105 |
| 5,703,194 A | * | 12/1997 | Malik et al. | 528/70 |

(List continued on next page.)

FOREIGN PATENT DOCUMENTS

| | | | |
|---|---|---|---|
| CA | 915154 A | * | 6/1968 |
| JP | 62-246621 A | * | 10/1987 |
| JP | 64-065322 | * | 3/1989 |
| JP | 1-165695 A | * | 6/1989 |
| JP | 4181018 | | 6/1990 |
| JP | 874846 | | 3/1996 |
| JP | 8-226446 A | | 9/1996 |

OTHER PUBLICATIONS

Microfilm of the specification and drawings annexed to the request of Japanese Utility Model Application No. 31368/1987 (Laid–oopen No. 138662/1988) (NEC Corp.) Sep. 13, 1988.

Primary Examiner—Brian E. Miller
Assistant Examiner—Tianjie Chen
(74) Attorney, Agent, or Firm—Birch, Stewart, Kolasch & Birch, LLP

(57) ABSTRACT

A rolling bearing is used for supporting a rocking mechanism or a rotating mechanism, and a film comprising a fluorine-containing polymer having a functional group(s) under a fluidizied state or a film comprising a fluorine-containing polyurethane compound under a solid state is formed on at least the track surface of the rolling bearing. Since this film does not contain ions for uniformly dispersing a thickner having non uniform particle sizes such as fluorine based grease of the prior art, breakage of the film between a rolling element and a race is not likely to occur, and wear of a rolling element race resulting from the direct contact between them due to breakage of the film can be reduced. When this film is tha same kind of a film as a protective film of the surface of an information recording disk, dust generating components of the film are the same kind of components as those of the protective film, and information recording/reproduction of the information recording disk is not impeded.

13 Claims, 11 Drawing Sheets

U.S. PATENT DOCUMENTS

| | | | | |
|---|---|---|---|---|
| 5,731,077 A | * | 3/1998 | Ogawa et al. | 428/333 |
| 5,939,363 A | * | 8/1999 | Toyota et al. | 508/106 |
| 5,940,246 A | * | 8/1999 | Khan et al. | 360/99.08 |
| 5,959,058 A | * | 9/1999 | Tonelli et al. | 528/70 |
| 5,969,903 A | * | 10/1999 | Parsoneault et al. | 360/99.08 |
| 6,007,286 A | * | 12/1999 | Toyota et al. | 411/428 |
| 6,038,205 A | * | 3/2000 | Katakura et al. | 369/266 |
| 6,113,278 A | * | 9/2000 | Ohira | 384/527 |
| 6,126,319 A | * | 10/2000 | Toyota et al. | 384/43 |
| 6,164,831 A | * | 12/2000 | Matsui et al. | 384/469 |
| 6,179,472 B1 | * | 1/2001 | Gilliland et al. | 384/477 |
| 6,240,641 B1 | * | 6/2001 | Toyota et al. | 29/898.03 |

* cited by examiner

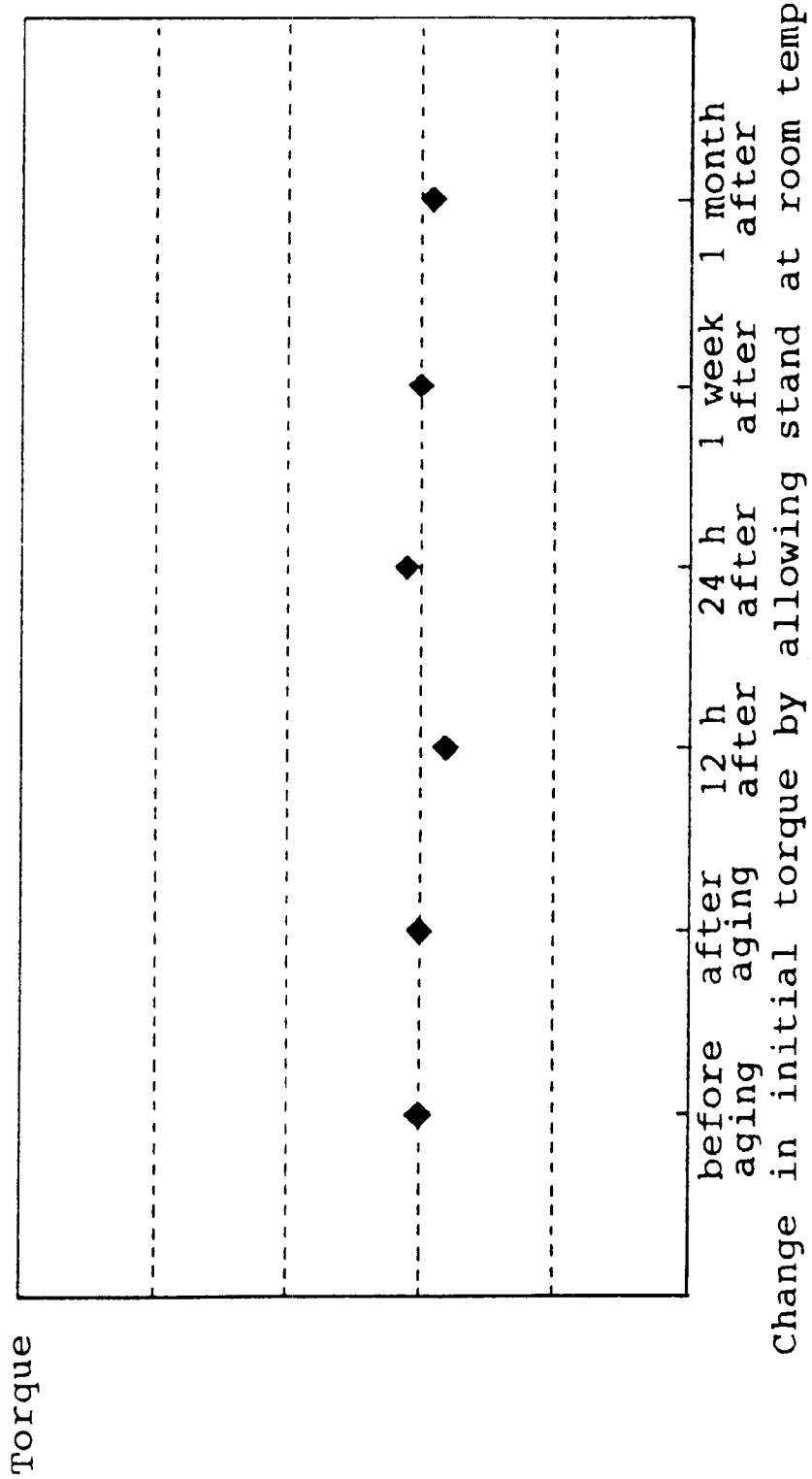

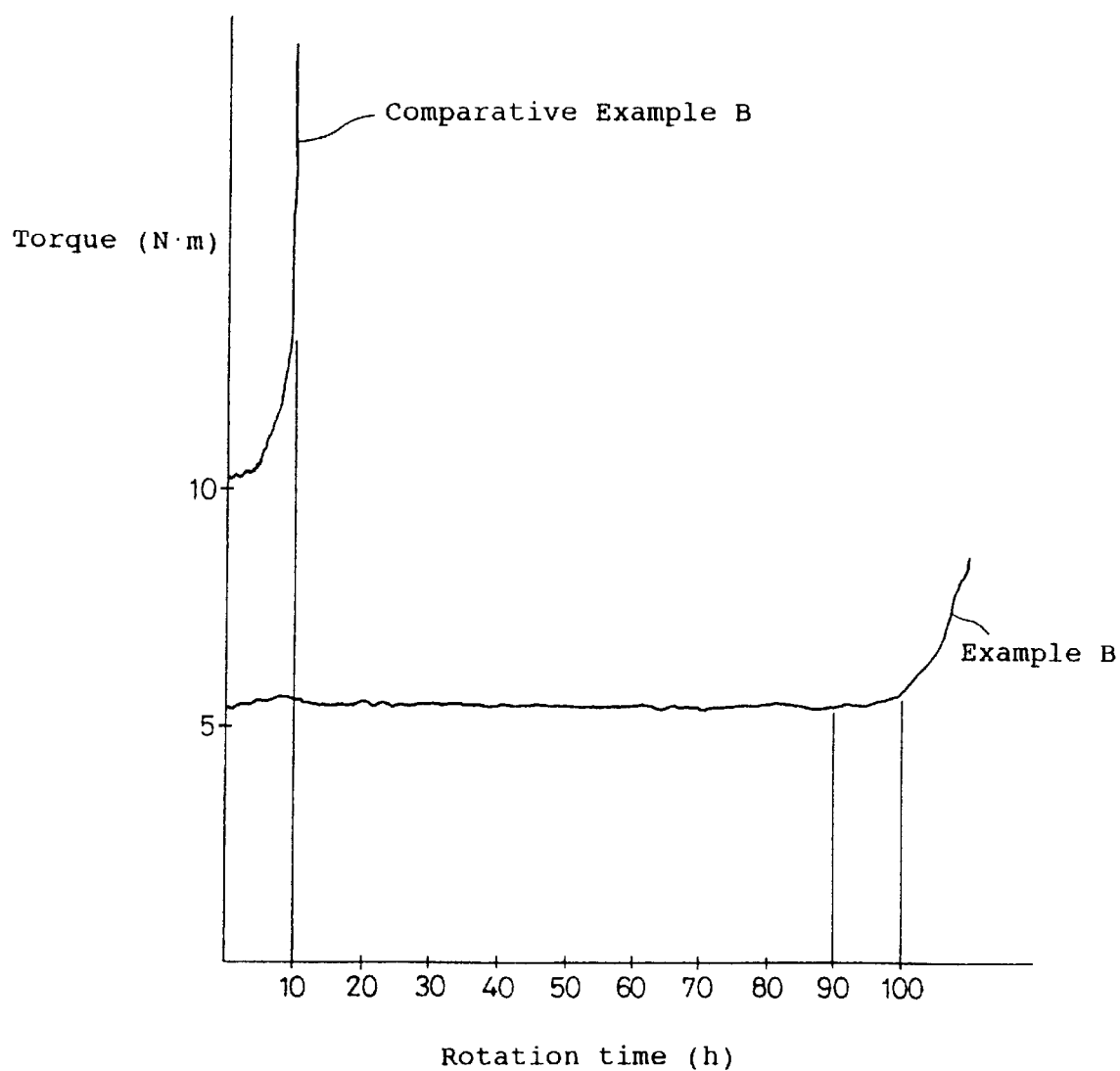
F I G. 1 2

INFORMATION EQUIPMENT WITH POLYMER FILM IN BEARING AND DISK

This application is the national phase under 35 U.S.C. §371 of PCT International Application No. PCT/JP98/01270 which has an International filing date of Mar. 24, 1998, which designated the United States of America.

TECHNICAL FIELD

The present invention relates to an information equipment. Specifically, the information equipment includes a drive device of a disk for recording information, such as a magnetic disk, an optical disk and the like, for example, a hard disk drive (HDD) device.

BACKGROUND ART

While the information equipment includes a rotating mechanism, such as a spindle fixed as piercing at the rotating center of a disk for recording information, and a rocking mechanism, such as a swing arm for moving a head for recording/reproduction of information, a spindle of a rocking fulcrum in the swing arm as the rocking mechanism is supported by two radial rolling bearings, as described, for example, in JP-A-5-135515. In the rolling bearing, a fluorine based grease excellent in lubricating property is used as a lubricating agent, and the minimum necessary amount thereof is sealed. As the fluorine based grease, one to which fine powder (for example, having a particle diameter of from 2 to 3 $\mu$m) of PTFE (polytetrafluoroethylene) or the like is added, such as a PTFE fluorocarbon oil grease, PTFE fluorosilicone oil grease, PTFE fluorinated polyether oil grease and the like, is exemplified. The fluorine based grease of this type employs an appropriate amount of an ion to make uniform the dispersion of a thickener having a non-uniform particle size.

In the information equipment, among the rotation mechanism and the rocking mechanism, the fluorine based grease described above is employed in a rolling bearing used for supporting a swing arm as the rocking mechanism, for example, and thus the problems described below occur.

Firstly, because the swing arm exhibits a movement of repeatedly rocking within a prescribed range of angle, the rolling element is sometimes dragged to slip at the rolling spindle that supports it, and at this time, in the case where a fluorine based grease is used as the lubricating agent described above, breakage of the film is likely to occur between the rolling element and a race. Such breakage of the film may become a cause of occurrence of wear of the rolling element and the race -due to direct contact of the rolling element and the race.

Furthermore, in the case of the PTFE as a thickener added to the fluorine based grease, a particle diameter larger than the standard are mixed due to difficulty in selecting a operation. Also, a minute spike noise is generated from the rolling spindle, and the torque characteristics for the rocking movement of the swing arm is likely to become unstable, which becomes a cause of lowering of the positioning accuracy of a head on the recording/reproduction.

Furthermore, leakage of the fluorine based grease may occur, and in the case where the ion for uniform dispersion of the thickener, in particular, of the leaking fluorine based grease is attached to the surface of the disk for recording information to be incorporated into a protective film of the disk for information recording, a problem occurs in that it becomes an obstruction of recording/reproduction.

Furthermore, in the case where such an information equipment is used in a low pressure atmosphere, such as under vacuum, a gas is generated from the fluorine based grease, and a problem occurs in that the gas adversely affects the protective film of the disk for recording information.

Furthermore, in the case of a grease other than the fluorine based one, a problem occurs in that a hydrocarbon contained therein adversely affects the information equipment. Furthermore, in a bearing using a grease, when it is not used but allowed to stand for a long period of time, the grease is hardened to cause a problem in that the rotation torque at the beginning of use becomes large.

Therefore, an object of the invention is that in an information equipment, the lubricating property, the torque characteristics and the property of generation of dusts of a rolling bearing for supporting a rocking mechanism or a rotating mechanism are improved, so as to stabilize the operation of the recording/reproduction of information.

DISCLOSURE OF THE INVENTION

[Constitution]

(1) A first information equipment embodiment of the invention comprises a rocking mechanism for rocking an element of the equipment, and a rolling bearing for supporting the rocking mechanism, wherein the rolling bearing has, on at least a race surface thereof, a film comprising a fluorine-containing polymer having a functional group formed under a state having fluidity, and a thickness thereof is set at 0.2 $\mu$m or less.

In the first embodiment of the invention, preferably, the rolling bearing has the film formed at least one race surfaces of an inner race and an outer race.

In the first embodiment of the invention, preferably, the functional group has high affinity to a metal.

In the first embodiment of the invention, preferably, the fluorine-containing polymer is a fluoropolyether polymer.

In the first embodiment of the invention, preferably, the fluorine-containing polymer is a polyfluoroalkyl polymer.

In the first embodiment of the invention, preferably, recording/reproduction of information is conducted to a disk for recording information having, on a surface thereof, a protective film of the same component as the film.

(2) A second information equipment embodiment of the invention comprises a rotating mechanism for rotating an element of the equipment, and a rolling bearing for supporting the rotating mechanism, wherein the rolling bearing has, on at least a race surface thereof, a film comprising a fluorine-containing polymer having a functional group formed under a state having fluidity, and a thickness thereof is set at 0.2 $\mu$m or less.

(3) A third information equipment embodiment of the invention comprises a rocking mechanism for rocking an element of the equipment, and a rolling bearing for supporting the rocking mechanism, wherein the rolling bearing has, on at least a race surface thereof, a solid film comprising a fluorine-containing polyurethane polymer compound.

In the third embodiment of the invention, preferably, the rolling bearing has the film formed at least one race surfaces of an inner race and an outer race.

In the third embodiment of the invention, preferably, the fluorine-containing polyurethane polymer compound has a three-dimensional network structure.

In the third embodiment of the invention, preferably, a fluorine-containing polymer compound having fluidity is added to the fluorine-containing polyurethane polymer.

In the third embodiment of the invention, preferably, recording/reproduction of information is conducted to a disk for recording information having on a surface thereof, a protective film of the same component as the film.

(4) A fourth information equipment embodiment of the invention comprises a rotating mechanism for rotating an element of the equipment, and a rolling bearing for supporting the rotating mechanism, wherein the rolling bearing has, on at least a race surface thereof, a solid film comprising a fluorine-containing polyurethane polymer compound.

(5) A fifth information equipment embodiment of the invention comprises a head for recording/reproduction for conducting recording/reproduction of information to a disk for recording information, a rocking mechanism for moving the head by rocking, and a rolling bearing for supporting the rocking mechanism, wherein the rolling bearing has, on at least on a race surface thereof, a film of the same kind as a protective film on a surface of the disk for recording information, formed under a solid state, and the film comprises a fluorine-containing polyurethane polymer compound.

[Function]

The film according to the invention, the functional group of the fluorine-containing polymer or the three-dimensional network structure of the fluorine-containing polyurethane polymer compound is firmly adhered to the adherend surface, whereby breakage of the film and generation of dusts are difficult to occur, and the friction resistance is extremely small. Furthermore, the film does not contain the thickener having a non-uniform particle diameter or the ion for uniform dispersion of the thickener as in the conventional fluorine based grease. Moreover, when the film thickness of the film is set as thin as possible at 0.2 $\mu$m or less, generation of dusts of the oily component will substantially not occur. Therefore, the operation of the rolling bearing becomes extremely smooth, and minute spike noise that occurs conventionally are not generated.

[Effect]

Accordingly, the information equipment of the invention becomes extremely smooth, and the torque characteristics stabilized, for example, a minute spike noise that occurs conventionally is not generated because a film that is difficult to obtain breakage or generation of dusts, exhibits an extremely small friction resistance. Further, because the information equipment of the invention does not contain the thickener having a non-uniform particle diameter or the ion for uniform dispersion of the thickener as in the conventional fluorine based grease that controls the thickness thereof, on a race surface of a race of a rolling bearing used in a rocking mechanism or a rotating mechanism thereof.

In the case where the information equipment of the invention comprises a disk for recording information and a head for recording/reproduction provided in the vicinity of the rolling bearing, the positional accuracy of the head for recording/reproduction and the rotating accuracy of the disk for recording information are improved because the torque characteristic of the rolling bearing for their fulcrum is stable. Moreover, even though a dust component from the film is incorporated in a protective film which is generally formed on the disk for recording information, it is not an obstruction of the recording/reproduction because the film is of the same component as the protective film.

As described herein, the invention can provide an information equipment having high reliability that exhibits an excellent performance for a long period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a graph showing measurement results of change in torque after allowing stand at ordinary temperature;

FIG. 12 is a graph showing test results relating to the torque life of the bearing under a vacuum environment.

BEST MODE FOR CARRYING OUT THE INVENTION

The invention will be described in detail below based on the best mode for carrying out the invention shown in the attached drawings.

Figure 1:
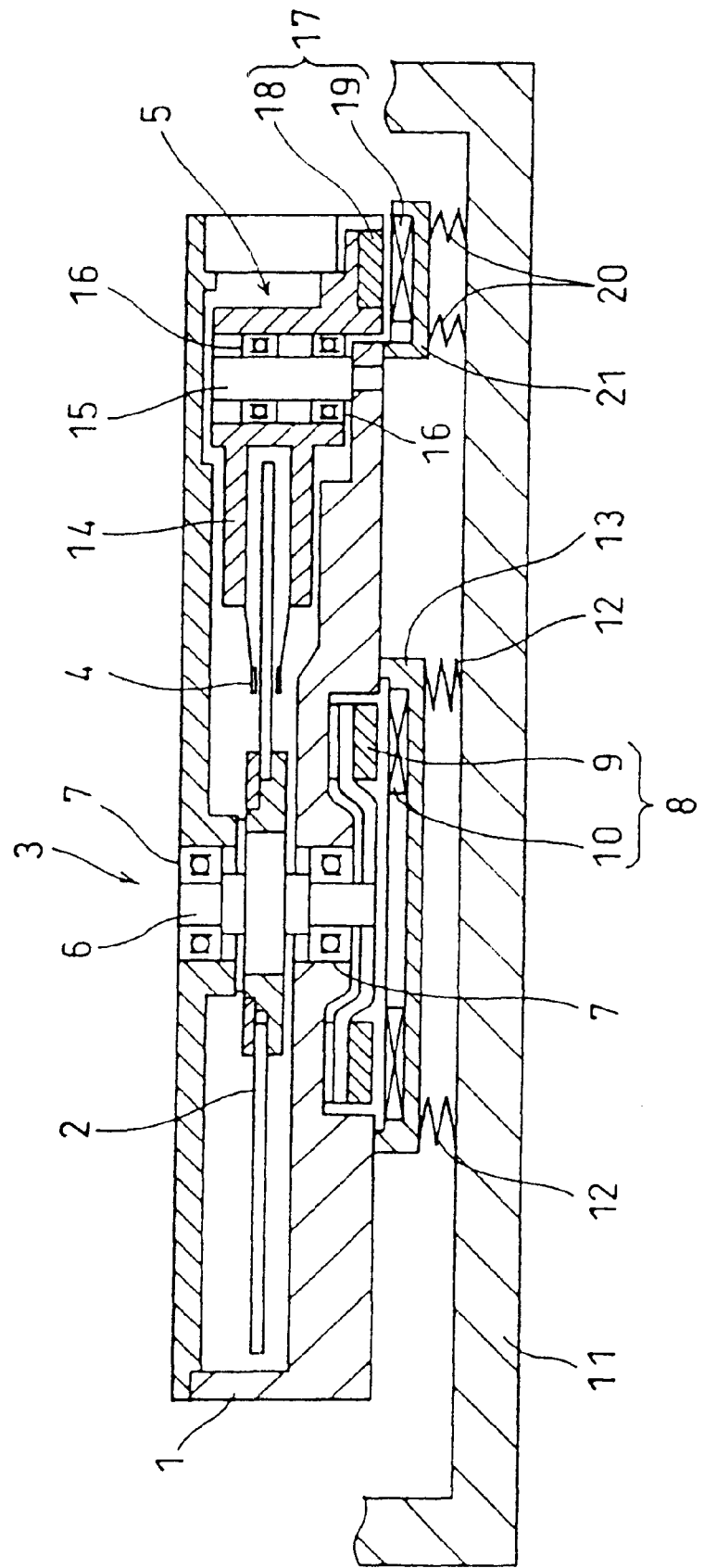
FIG. 1 is a vertical sectional view of a hard disk drive device according to one embodiment of the invention.
Figure 2:
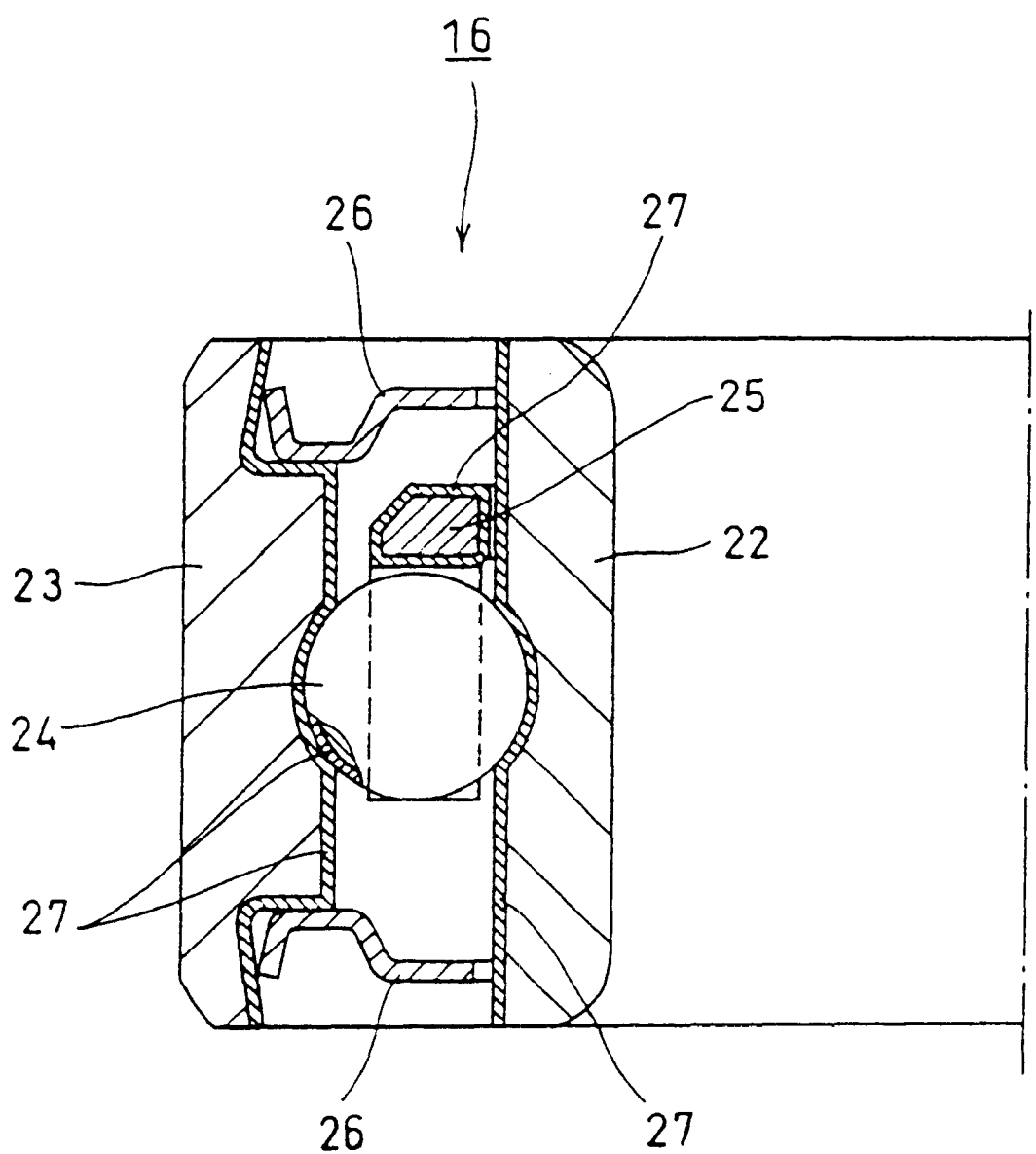
FIG. 2 is an enlarged diagram of a half of a rolling bearing of a moving unit of FIG. 1.

The elements constituting the hard disk drive device as the information equipment shown in FIG. 1 is described, in which numeral 1 denotes a frame of the hard disk drive device, 2 denotes a disk for recording information, such as a magnetic disk, an optical disk and the like, arranged horizontally inside the frame 1, 3 denotes a spindle unit supporting the disk 2 for recording information freely rotatable to the frame 1, 4 denotes a recording/reproduction head conducting recording/reproduction to the disk 2, and 5 denotes a movement unit for moving the recording/reproduction head 4 to an arbitrary track of the disk 2 for recording information.

A protective film (not shown in the figure) is formed on the surface of the disk 2 for recording information in under a state having fluidity. The protective film generally comprises perfluoropolyether (PFPE).

The spindle unit 3 comprises a spindle 6 fixed as piercing at the rotating center of the disk 2 for recording information under a state of protruding upward and downward, rolling bearings 7 supporting the parts of the spindle 6 protruding upward and downward freely rotatable with respect to the frame 1, and a motor 8 for rotatably driving the disk 2 for recording information.

In the invention, the spindle 6 supported by the rolling bearings 7 forms the rotating mechanism, but the rotating mechanism is not limited thereto, and any rotating mechanism among the mechanism elements contained inside the information equipment is included therein.

The motor 8 comprises a rotor 9 comprising a permanent magnet fixed at the lower end of the spindle 6 protruding downward with respect to the frame 1, and a stator 10 comprising a coil oppositely aligned at the lower portion of the rotor 9 in a non-contact state.

The stator 10 is adhered to a yoke 13 attached on a substrate 11 on the side of the frame 1 through an elastic body 12 such as a coil spring repulsing and energizing.

The movement unit 5 comprises a swing arm 14 to which the recording/reproduction head 4 is attached, a head carriage axis 15 fixed to the frame 1, a pair of rolling bearings 16 supporting the swing arm 14 by the head carriage axis 15 freely rockable, and a motor 17 driving rockably the swing arm 14.

In the invention, the swing arm 14 and the head carriage axis 15, as the rocking mechanism, are supported by the rolling bearings 16, but the rocking mechanism of the invention is not limited thereto, and any rocking mechanism among the mechanism elements contained inside the information equipment is included therein.

The motor 17 comprises a rotor 18 comprising a permanent magnet fixed at the lower end of the swing arm 14, and a stator 19 comprising a coil arranged facing and under the rotor 18 in a non-contact manner.

The stator 19 adhered to a yoke 21 attached to the substrate 11 on the side of the frame 1 through an elastic body 20 such as a coil repulsing and energizing.

The pair of rolling bearing 16 provided in the movement unit 5 is a deep groove ball bearing comprising an inner race 22, an outer race 23, a spherical rotating body 24, a retainer in a crown shape 25 and a seal 26.

The inner and outer races 22 and 23, and the rotating body 24 are formed with a metallic material.

As the metallic material, for example, a high carbon chromium bearing steel such as SUJ2 of the JIS can be exemplified. In the case where corrosion resistance is demanded, a metallic material obtained by conducting a suitable hardening heat treatment to a martensite series stainless steel such as SUS440C of the JIS, a deposition hardening type stainless steel such as SUS630 of the JIS, and the like are preferred. In the usage of a light load, an austenite series stainless steel such as SUS304 of the JIS may be used. The rotating body 24 may be formed with a ceramic material. As the ceramic material, those mainly comprising silicon nitride ($Si_3N_4$) with using, as a sintering aid, yttria ($Y_2O_3$) and alumina ($Al_2O_3$), as well as aluminum nitride (AlN), titanium oxide ($TiO_2$) and spinel ($MgAl_2O_4$), as well as those mainly comprising alumina ($Al_2O_3$), silicon carbide (SiC), zirconia ($ZrO_2$), aluminum nitride (AlN) and the like may be used.

The retainer 25 is formed with a soft steel such as an SPCC material, as well as a synthetic resin material.

As the synthetic resin material, a general polyamide resin (nylon 66), as well as a thermoplastic resin having heat resistance, for example, a fluorine based resin, such as polytetrafluoroethylene (hereinafter abbreviated to PTFE), ethylene tetrafluoroethylene (ETFE) and the like, engineering plastics, such as polyetheretherketone (PEEK), polyphenylenesulfide (PPS), polyethersulfone (PES), nylon 46 and the like, and the like may be used. As the type of the retainer, in addition to the crown shape shown in the figure, a wave shape, a rice hull shape and the like may be arbitrarily used.

In the invention, a film 27 comprising a fluorine-containing polymer containing a functional group or a film 27 in a solid state comprising a fluorine-containing polyurethane polymer compound is formed on the outer peripheral surface of the inner race 22, the inner peripheral surface of the outer race 23, the surface of the rotating body 24, and the surface of the retainer 25.

The case (A) where the film 27 comprising the fluorine-containing polymer is formed, and the case (B) where the film 27 comprising the fluorine-containing polyurethane polymer compound is formed are described separately in detail below.

(A) Film 27 Comprising Fluorine-containing Polymer Having Functional Group

In the case of the film 27 comprising the fluorine-containing polymer having a functional group, it is formed on the outer peripheral surface of the inner race 22, the inner peripheral surface of the outer race 23, the surface of the rotating body 24, and the surface of the retainer 25 under a state having fluidity. The film 27 may be formed at least on the race surfaces of the inner and outer races 22 and 23.

The film 27 has the same component as the protective film of the disk 2 for recording information as described in the foregoing. As the fluorine-containing polymer, a fluoropolyether polymer or a polyfluoroalkyl polymer is preferred.

As the fluoropolyether polymer, those having a unit shown by the general formula —$C_xF_{2x}$—O— (X is an integer of from 1 to 4) as the main structural unit, and having a number average molecular weight of from 1,000 to 50,000 are exemplified.

As the polyfluoroalkyl polymer, those shown by the following chemical formula 1 are exemplified.

As the functional group, those having high affinity to a metal (for example, an alcohol group, an epoxy group, an amino group, a carboxyl group, a hydroxyl group, a mercapto group, an isocyanate group, a sulfone group, an ester group or the like) are preferred. Polyfluoroalkyl polymers having such a functional group are shown by the following chemical formulae 2 and 3. These fluorine-containing polymers may be used singly or may be used in combination of two or more kinds. In this case, in order to obtain a thin film that is further excellent in wear resistance, it is desirable that consideration is made in that the groups combined react each other to make the polymer to have a further high molecular weight.

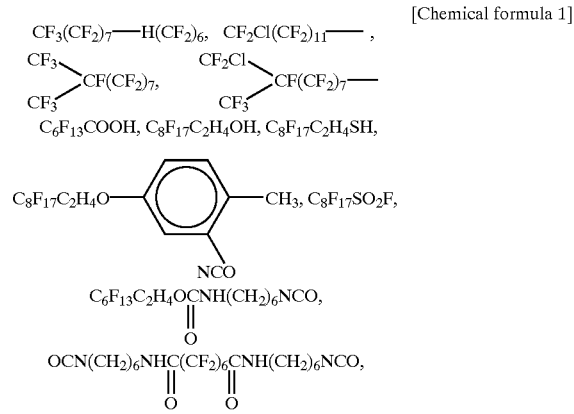

[Chemical formula 1]

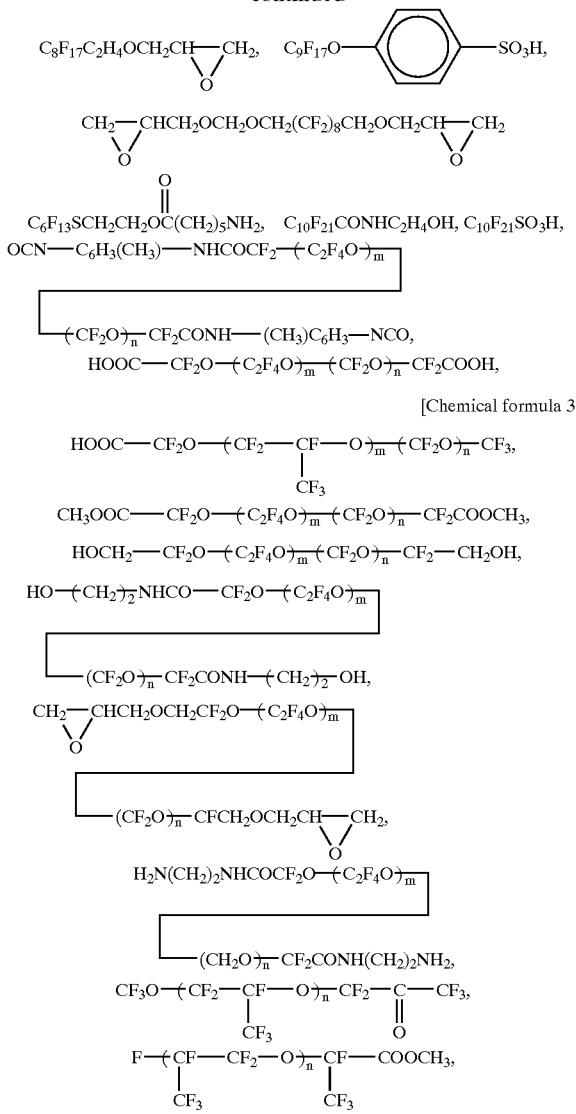

As the film 27 described above in more detail, a perfluoropolyether (PFPE) or a mixture with a derivative thereof, specifically FONBLIN Y Standard, FONBLIN Emulsion (FE20, EM04 and the like) and FONBLIN Z derivatives (FONBLIN Z DEAL, FONBLIN Z DIAC, FONBLIN Z DISOC, FONBLIN Z DOL, FONBLIN Z DOLTX2000, and FONBLIN Z TETRAOL, etc.), trade names of Montecatini Inc., is preferably used. Those exemplified have a high concentration and are extremely poor in affinity to a metal, and they are difficult to be attached in the form of a film as they are. Therefore, the following method is applied to the formation of the film 27.

An example of a method for forming the film 27 described above is then described below.

(A-a) Attaching Treatment

A solution for obtaining the film 27 comprising the fluorine-containing polymer having a functional group is prepared, and the inner and outer races 22 and 23, the rotating body 24 and the retainer 25 are individually immersed in the solution, or the bearing 16 in the state obtained by fabricating them is immersed and rotating in a few times, so as to attach a film in a liquid state to the inner race 22, the outer race 23, the rotating body 24 and the retainer 25.

In the case of locally attaching, it is immersed after masking the unnecessary part, or the solution is sprayed. Furthermore, the solution may be injected in the position between the inner and outer races 22 and 23, at which the rotating body 24 is present, by a syringe that can inject the solution in a slight amount. The solution prepared herein is obtained by diluting, for example, FONBLIN Z DOL2000 (the molecular weight is 2,000) of FONBLIN Z DOL with a suitable dilution solvent (fluorine series solvent SV90) to a FONBLIN concentration of from 0.25 to 1.0 mass %.

(A-b) Drying Treatment

The whole of the rolling bearing 16, to which the liquid state film is attached, is heated to from 40 to 50° C. for about 3 minutes to remove the solvent contained in the liquid state film.

(A-c) Finishing Drying Treatment

Thereafter, considering the atmospheric temperature of the environment where the bearing is used, it is heated to, for example, from 80 to 180° C. for from 15 to 60 minutes.

The attaching treatment (A-a) and the drying treatment (A-b) may be repeated several times depending on necessity, and finally the film thickness of the film 27 is set at, for example, 0.2 μm or less. However, the property of the solution used, the method for forming the thin film, the film thickness after formation and the like may be appropriately set.

According to the procedures, in the constitutional elements of the rolling bearing 16, the film 27 can be formed at the parts that are in contact with each other to a suitable thickness, and by removing the solvent as described above, unnecessary generation of dusts on operation of the rolling bearing 16 does not occur. Since the film thickness of the film 27 is set at extremely thin, generation of dusts due to an oily component does substantially not occur.

Because the functional group of the fluorine-containing polymer is firmly fixed to the adherend surface (the surface of the rolling bearing), the film 27 is difficult to suffer breakage of the film and generation of dusts, and exhibits extremely small friction resistance although it has fluidity. Furthermore, the film 27 has the same component as the protective film (not shown in the figure) attached to the disk 2 for recording information, and does not contain a thickener having non-uniform particle diameters or an ion for uniform dispersion of the thickener, as in the conventional fluorine based grease.

Accordingly, the torque characteristics is stabilized, for example, the operation of the rolling bearing 16 for supporting the recording/reproduction head 4 becomes extremely smooth, so as not to form a minute spike noise, which has been conventionally observed, and as a result, the positional accuracy of the recording/reproduction head 4 is improved. Even when the dust component generated from the film 27 is caught by the protective film of the disk 2 for recording information, because the protective film and the dust component from the film 27 have the same component, it does not become obstruction of recording/reproduction.

The dust generation life and the torque life of the film 27 described above have been investigated, and are described. Two samples, an example and a comparative example, are investigated herein.

In Example A, the film 27 is formed on the whole surfaces of the inner and outer races 22 and 23, the rotating body 24, and the retainer 25, and the thickness thereof is set at 0.2 μm. As the film 27, a fluorine-containing polymer having a functional group with an end group of a hydroxyl group (—OH) (FONBLIN Z Derivative (FONBLIN Z DOL2000)) is used, with the concentration being 0.25 mass % and the film thickness being 0.2 μm.

In Comparative Example A, DEMNUM, a trade name, produced by Daikin Industries, Ltd. is used as a fluorine based grease, which is sealed in the rolling bearing 16.

Figure 3:
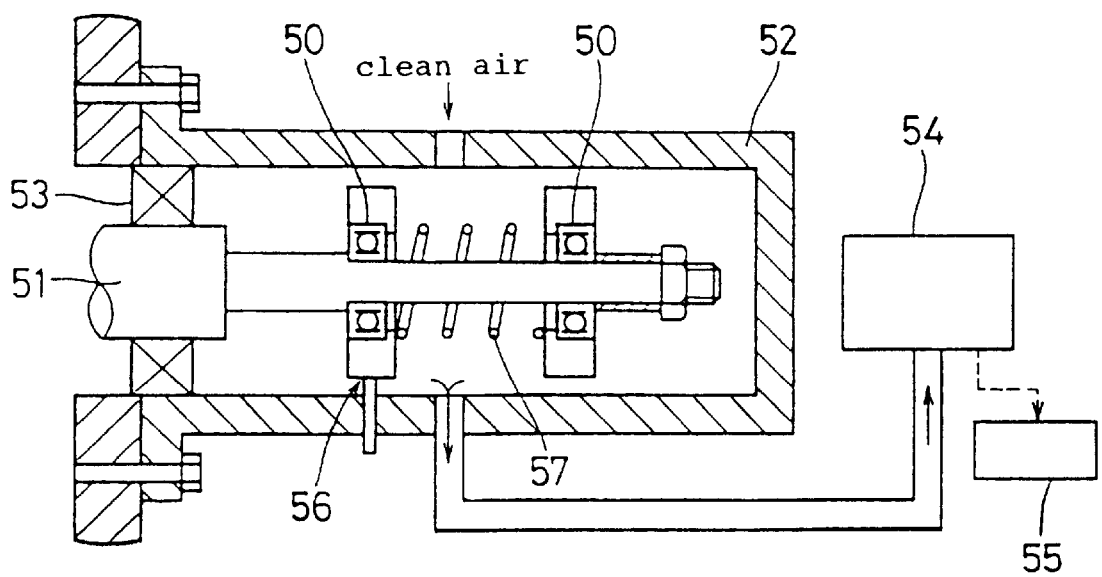
FIG. 3 is a schematic constitutional view of a test equipment used under an atmospheric environment.
Figure 4:
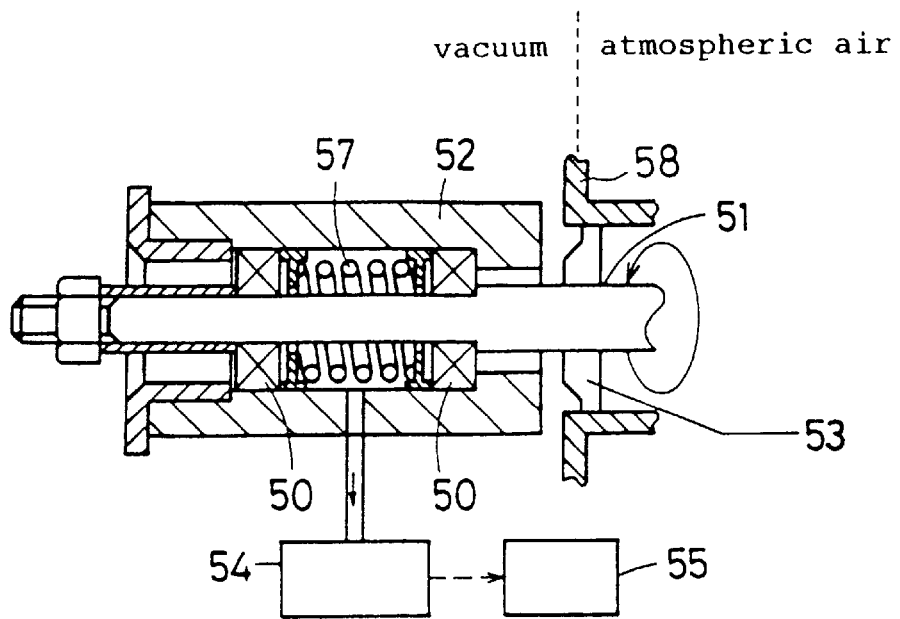
FIG. 4 is a schematic constitutional view of a test equipment used under a vacuum environment.

For the test in an atmospheric environment, the equipment shown in FIG. 3 is used, and for the test in a vacuum environment, the equipment shown in FIG. 4 is used. In the figures, numerals 50 and 50 denote test bearings, 51 denotes a rotation axis, 52 denotes a casing, 53 denotes a magnetic fluid seal, 54 denotes a device for measuring the number of dusts generated (a particle counter), 55 denotes a device for recording the measurement results (a recorder), 56 denotes a bearing housing, and 57 denotes a coil spring for applying an axial load. Numeral 58 denotes a part of a chamber wall of a vacuum chamber, and in this figure of the chamber wall, the left-hand side is vacuum, and the right-hand side is the atmosphere. The test bearing 50 is a bearing number of SE608 (8 in diameter×22 in diameter×7) in both the example and the comparative example, in which the inner and outer races and the rotating body (ball) are SUS440C of the JIS, and the retainer (wave type) is SUS304 of the JIS. The surface roughness of the tracks of the inner and outer races is 0.1Z, and the surface roughness of the rotating body is 0.05a.

The test conditions are as follows:
Rotation rate: 200 rpm
Load: axial load (50 N)
Atmosphere: in clean bench (Class 10) in the atmosphere vacuum ($2.6 \times 10^4$ Pa or less)
Environmental temperature: room temperature
Measurement condition: number of dust particles having a particle diameter of 0.1 μm or more A-(1) In the dust generation test, the total amount of dusts generated during the first 50 hours of the rotation was measured with the measurement atmosphere being the atmospheric air, the environmental temperature being room temperature, and the axial load being 50 N. The measurement was conducted for dust particles having a particle diameter of 0.1 μm or more. The result was 30 for Comparative Example A, and 10 for Example A, and thus Example A is excellent in comparison to Comparative Example A.

Figure 5:
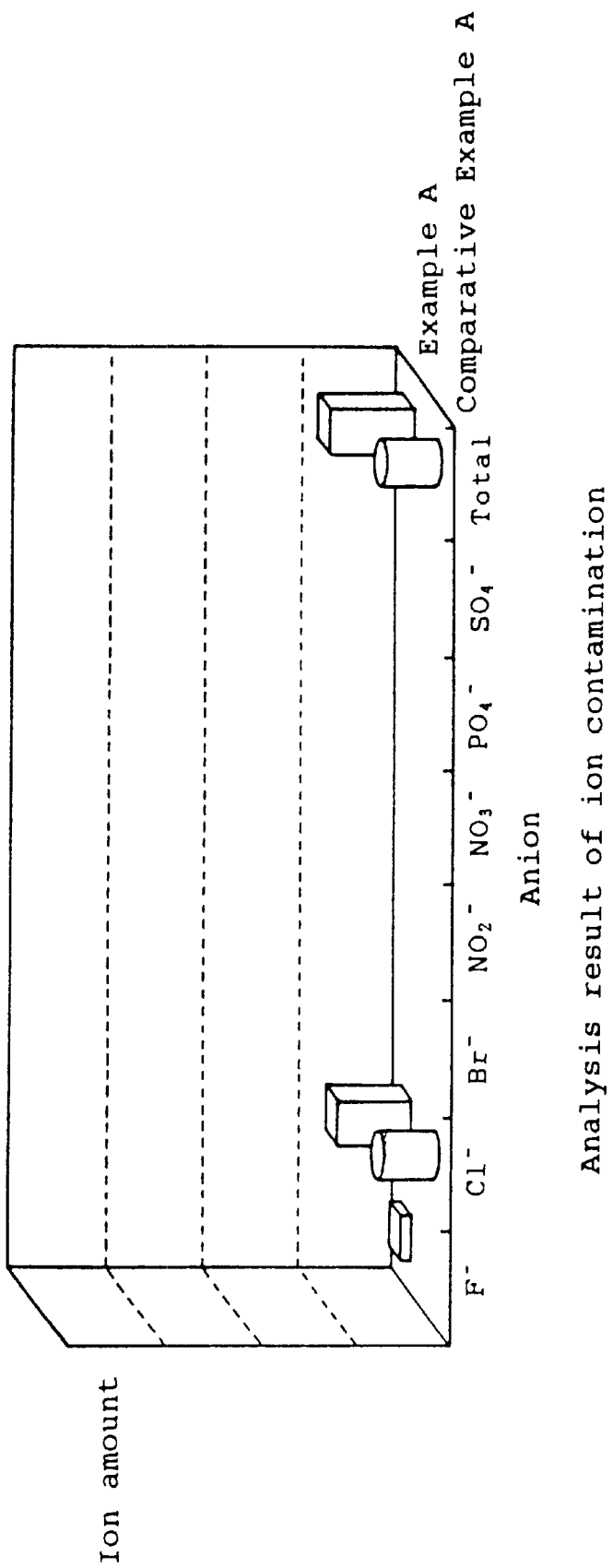
FIG. 5 is a graph showing measurement results of the ion contamination performance.

A-(2) In the ion contamination performance test, the anion amount generated from the rolling bearing was measured. As a result, as shown in the graph of FIG. 5, the amount of the anion generated in Example A is smaller than that in Comparative Example A.

Figure 6:
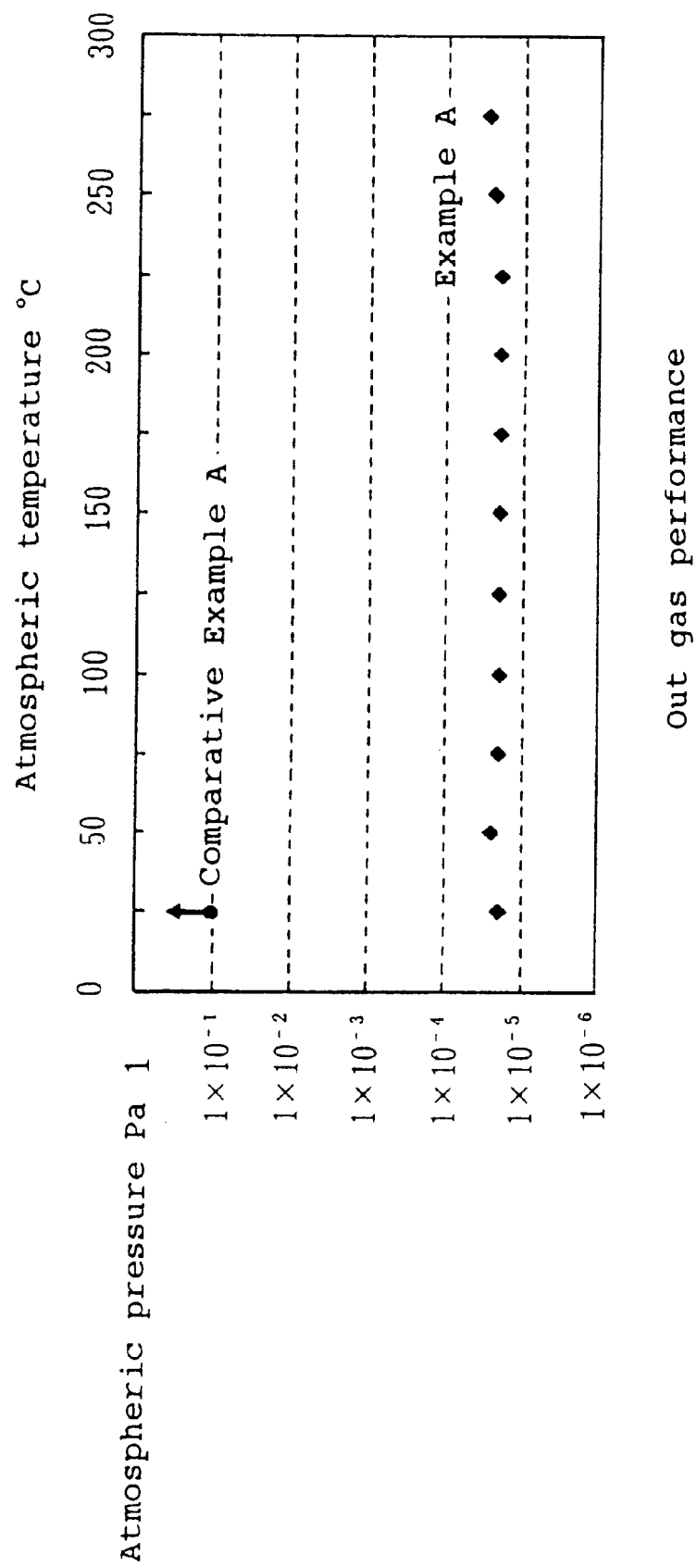
FIG. 6 is a graph showing measurement results of the out gas performance.

A-(3) In the out gas performance test, as shown in the graph of FIG. 6, under the pressure of from the atmospheric pressure to $1 \times 10^{-6}$ Pa, the temperature, at which a gas is generated, was measure with gradually increasing the atmospheric temperature. As a result, in Comparative Example A, a gas is generated at a level of room temperature and a pressure of $1 \times 10^{-1}$ Pa, whereas in Example A, no gas is generated even when the pressure is lowered to $1 \times 10^{-4}$ Pa.

A-(4) With respect to the torque characteristics, the spike noise is 0.072 gfcm in Example A, whereas the spike noise is 0.156 gfcm in Comparative Example A, and thus that in Example A is reduced by half in comparison to Comparative Example A. With respect to noise characteristics, i.e., sound (axial vibration value), it is 38.8 mG in Example A, whereas it is 44.6 mG in Comparative Example A, and thus Example A is good in comparison to Comparative Example A.

A-(5) With respect to the change in torque after allowing stand at room temperature, as shown in the graph of FIG. 8, no change was found after allowing stand for 1 month or more in comparison to the value immediately after aging.

(B) Film 27 in Solid State comprising Fluorine-containing Polyurethane Polymer Compound The case where the film 27 in a solid state comprising the fluorine-containing polyurethane polymer compound is formed on the outer peripheral surface of the inner race 22, the inner peripheral surface of the outer race 23, the surface of the rotating body 24, and the surface of the retainer 25 is described. The film 27 also may be formed at least on the race surfaces of the inner and outer races 22 and 23.

The film 27 has a three-dimensional network structure comprising a unit shown by the general formula —$C_xF_{2x}$—O— (X is an integer of from 1 to 4) as the main structural unit, in which the average molecular weight is several millions, and the molecules are bonded to each other with an urethane bond. The three-dimensional network structure is an expression of chemical structure, and it does not mean that the cross section of the film is of network, but means that the molecules are continuously connected to form network to form a uniform structure packed densely. Such a fluorine-containing polyurethane polymer compound may be formed by changing the chemical structure by using a fluorine-containing polymer having a functional group with the ends being an isocyanate shown in the following chemical formula 4. As the fluorine-containing polymer having a functional group with the ends being an isocyanate, a derivative of perfluoropolyether (PFPE), specifically FONBLIN Z Derivative (FONBLIN Z DISOC, etc.), a trade name, of Montecatini Inc., is preferably used.

[Chemical formula 4]

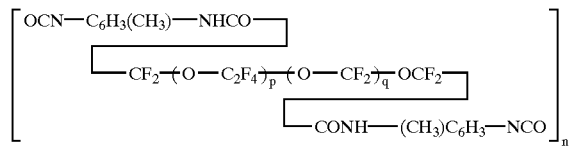

An example of a method for forming the film 27 of the fluorine-containing polyurethane polymer compound described above is then described.

(B-a) Attaching Treatment

A solution for obtaining the film 27 comprising the fluorine-containing polyurethane polymer compound is prepared, and the inner and outer races 22 and 23, the rotating body 24 and the retainer 25 are individually immersed in the solution, or the bearing 16 in the state obtained by fabricating them is immersed and rotating in a few times, so as to attach a film in a liquid state to the inner race 22, the outer race 23, the rotating body 24 and the retainer 25.

In the case of locally attaching, it is immersed after masking the unnecessary part, or the solution is sprayed.

Furthermore, the solution may be injected in the position between the inner and outer races 22 and 23, at which the rotating body 24 is present, by a dropping pipette or the like.

The solution prepared herein is obtained by diluting, for example, the fluorine-containing polymer having a functional group with the ends being an isocyanate (FONBLIN Z Derivative (FONBLIN Z DISOC) with a suitable dilution solvent (fluorine series solvent SV90) to a concentration the fluorine-containing polymer of 1 mass %.

(B-b) Drying Treatment

The whole of the rolling bearing 16, to which the liquid state film is attached, is heated to from 40 to 50° C. for about 1 minute to remove the solvent contained in the liquid state film.

In this stage, it is still a liquid film having fluidity.

(B-c) Hardening Treatment

Thereafter, it is heated to from 100 to 200° C. for 20 hours.

Figure 9A:
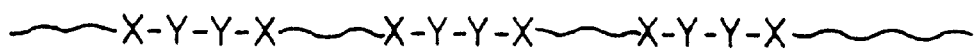
FIG. 9 is a structural diagram schematically showing the structure of the film formed in the rolling bearing of FIG. 2.
Figure 9B:
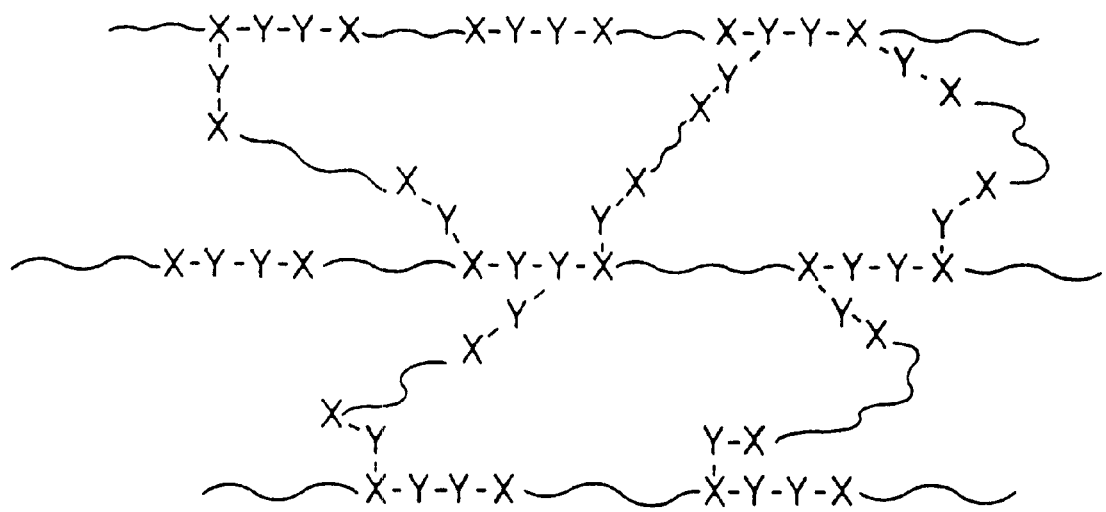

Accordingly, the chemical structure of the liquid film is changed to occur the hardening reaction, and a film 27 of the fluorine-containing polyurethane polymer compound is obtained. Incidentally, in this hardening treatment, the isocyanate (NCO) at the end of the individual fluorine-containing polymer having a functional group disappears by the four kinds of hardening reactions shown in the following chemical formulae 5 to 8, and the three-dimensional network structure is formed by bonding the respective fluorine-containing polymers having a functional group with urethane bonds. By the urethane bond, linear crosslinking schematically shown in FIG. 9A is formed by the hardening reactions shown in the chemical formulae 5 and 6, and three-dimensional crosslinking schematically shown in FIG. 9B is formed by the hardening reactions shown in the chemical formulae 7 and 8. In FIG. 9, the chemical formula 4 is schematically expressed with simplification as shown in the following chemical formulae 9.

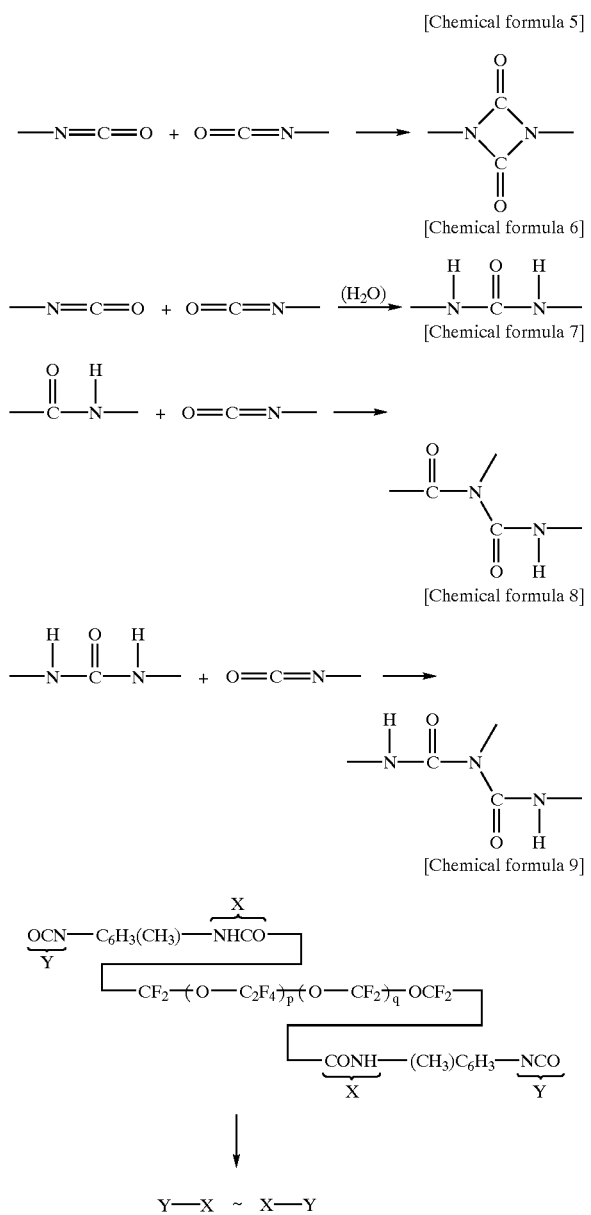

According to the procedures, in the constitutional elements of the rolling bearing 16, the film 27 can be formed at the parts that are in contact with each other to a suitable thickness. The attaching treatment (B-a) and the drying treatment (B-b) may be repeated several times depending on necessity, and finally the film thickness of the film 27 is set at, for example, from 0.1 to 3 μm. However, the property of the solution used, the method for forming the thin film, the film thickness after formation and the like may be appropriately set.

The properties of the state, in which the solution prepared in the attaching treatment (B-a) is only concentrated and dried (the state having fluidity), and the state, in which the solution prepared in the attaching treatment (B-a) is attached to a stainless steel plate or the like and then hardened, are analyzed and described.

Figure 10:
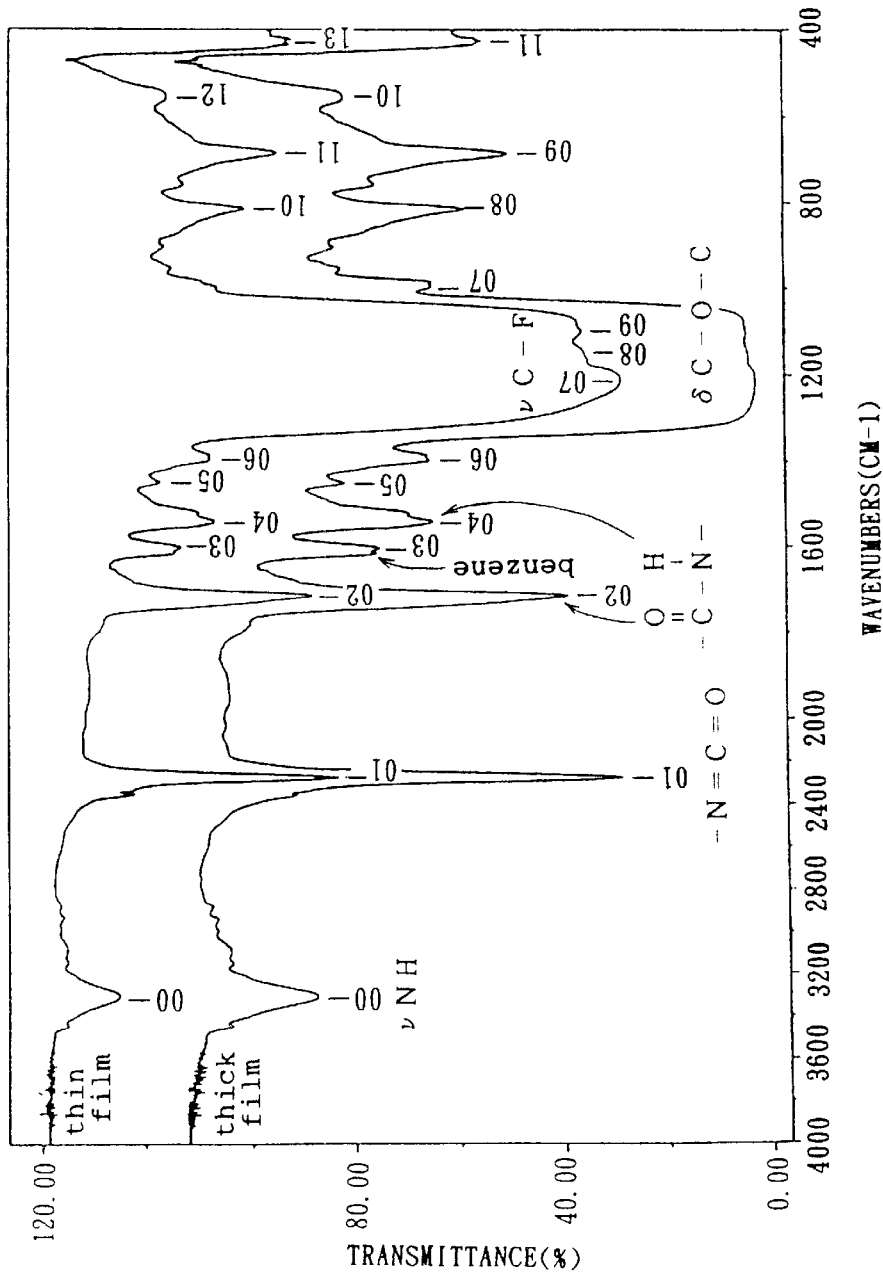
FIG. 10 is a graph showing results of characteristics analysis of the film in the state before hardening.
Figure 11:
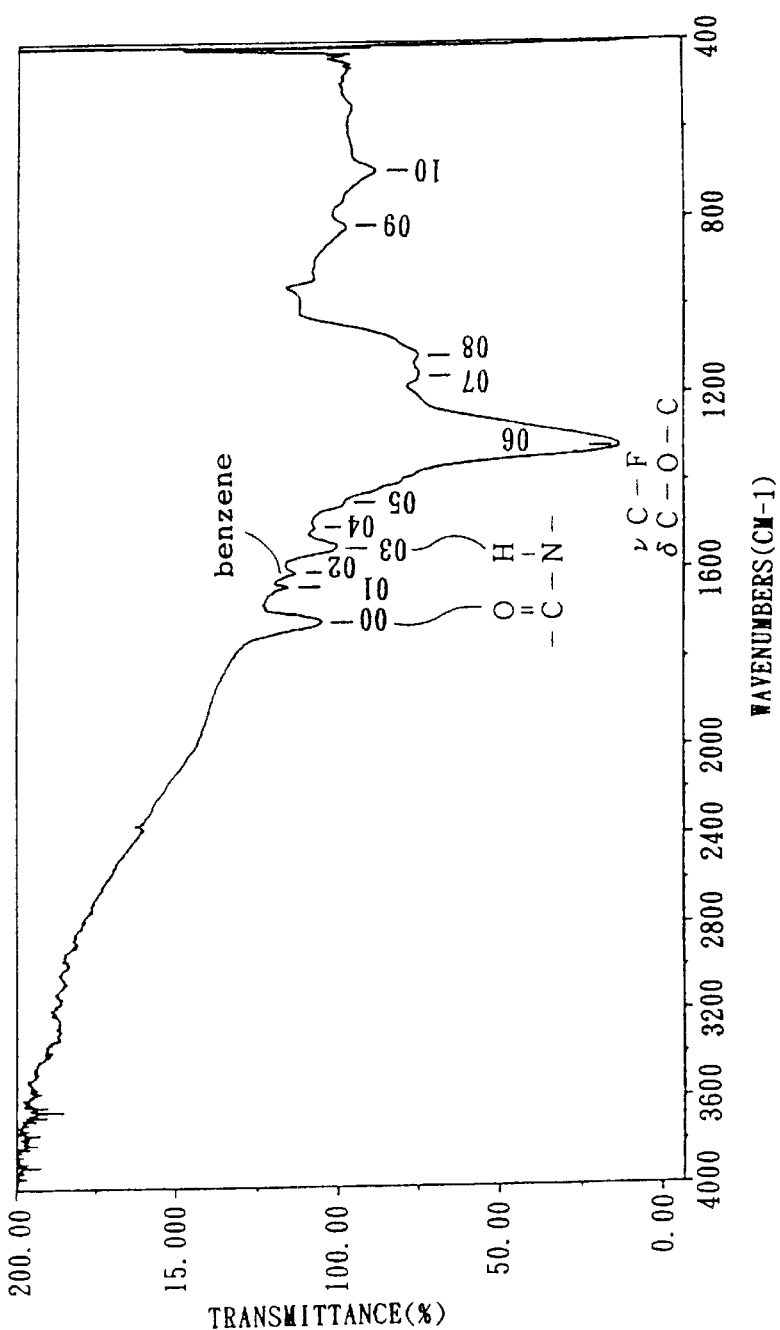
FIG. 11 is a graph showing results of characteristics analysis of the film in the state after hardening.

The former is analyzed by the FT-IR method (the Fourier transformation infrared spectroscopy, the liquid membrane method). As a result, as shown in the graph of FIG. 10 (examples of a thin film and a thick film are shown, respectively), peaks of NH (3,300 $cm^{-1}$), N=C=O (2,279 $cm^{-1}$), N(H)C=O (1,712 $cm^{-1}$ 1,546 $cm^{-1}$), benzene (1,600 $cm^{-1}$) and the like are found in addition to the peaks of the fluorine series, and it is confirmed that a benzene ring, an urethane bond and an isocyanate are present as a functional group. While the thin film and the thick film are respectively measured herein, the analysis can be conducted irrespective to the film thickness. The later is analyzed by the FT-IR method (the Fourier transformation infrared spectroscopy, the high sensitivity reflection method). As a result, as shown in the graph in FIG. 11, peaks of a benzene ring and an urethane bond are found, but a peak of an isocyanate is not found. That is, the change in chemical structure of the functional group by the hardening reactions shown by the chemical formulae 5 to 8 shown above is confirmed.

Because the film 27 described above has a three-dimensional network structure by itself to be densely coated on an article to be coated, and has a lubricating property by itself, generation of dusts such as wear and peeling can be suppressed to avoid direct contact of the constitutional elements of the bearing, and the friction resistance becomes extremely small, so that the rotating and sliding operation becomes smooth. Furthermore, the film 27 does not contain a thickener having non-uniform particle diameters and an ion for uniform dispersion of the thickener as in the conventional fluorine based grease.

Accordingly, the torque characteristics is stabilized, for example, the operation of the rolling bearing 16 for supporting the recording/reproduction head 4 becomes extremely smooth, so as not to form a minute spike noise, which has been conventionally observed, and as a result, the positional accuracy of the recording/reproduction head 4 is improved. Even when the dust component generated from the film 27 is caught by the protective film of the disk 2 for recording information, because the protective film and the dust component from the film 27 have the same component, it does not become obstruction of recording/reproduction.

Incidentally, as another example of the invention, the film 27 described in the examples described above may have a structure, in which a fluorine-containing polymer such as fluoropolyether is added and dispersed in a fluidized state into the three-dimensional network structure formed by bonding the molecules by an urethane bond. In this case, specifically, the solution prepared in the attaching treatment (B-a) in the forming method in the example describe above is changed to one obtained by mixing a fluorine-containing polymer having a functional group with the ends being an isocyanate (for example, FONBLIN Z Derivative, a trade name (FONBLIN Z DISOC, etc.)) and a fluorine-containing polymer containing no functional group as the fluorine-containing compound (for example, FONBLIN Z Derivative, a trade name (FONBLIN Z-60, etc.)) in a prescribed ratio. In this case, because the fluorine-containing polymer having no functional group is not bonded to the fluorine-containing polymer having a functional group in the hardening treatment (B-c), it becomes fluidized inside the film 27 to exhibit a lubricating function by oozing from the surface. The fluorine-containing polymer is not limited to the fluorine-containing polymer having no functional group described above, but may be the fluorine-containing polymers having a functional group shown in the chemical formulae 10 and 11.

[Chemical formula 10]

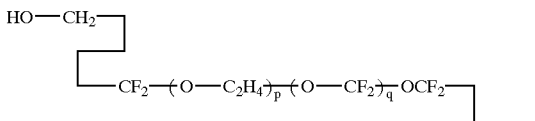

[Chemical formula 11]

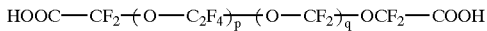

The dust generation life and the torque life of the film 27 described above have been investigated, and are described. Two samples, Example B and Comparative Example B, are investigated herein.

In Example B, the film 27 is formed on the whole surfaces of the inner and outer races 22 and 23, the rotating body 24, and the retainer 25. The film 27 is one obtained by adding a fluorine-containing polymer having no functional group (FONBLIN Z Derivative (FONBLIN Z-60) to a fluorine-containing polymer having a functional group with the ends being an isocyanate (FONBLIN Z Derivative (FONBLIN Z DISOC), in which the concentration of the FONBLIN Z Derivative (FONBLIN Z DISOC) is 1 mass %, and the concentration of the FONBLIN Z Derivative (FONBLIN Z-60) is 0.25 mass %.

In Comparative Example B, DEMNUM, a trade name, produced by Daikin Industries, Ltd. is used as a fluorine based grease, which is sealed in the rolling bearing 16.

For the test in an atmospheric environment, the equipment shown in FIG. 3 is used, and for the test in a vacuum environment, the equipment shown in FIG. 4 is used.

As the test bearing 50, the same one in the case of Example A and Comparative Example A of the film 27 comprising the fluorine-containing polymer is used in both Example B and Comparative Example B.

The test conditions for the rotation rate, the load, the atmosphere and the environmental temperature are also the same as the case of the film 27 comprising the fluorine-containing polymer.

The measurement conditions are also the same as the case of the film 27 comprising the fluorine-containing polymer.

B-(1) In the dust generation test, as similar to the case of the film 27 comprising the fluorine-containing polymer, the total amount of dusts generated during the first 50 hours of the rotation was measured with the measurement atmosphere being the atmospheric air, the environmental temperature being room temperature, and the axial load being 50 N. The measurement was conducted for dust particles having a particle diameter of 0.1 $\mu$m or more. The result was 30 for Comparative Example B, and 10 for Example B, and thus Example B is excellent in comparison to Comparative Example B.

That is, because the film 28 of Example B is a uniform film of a three-dimensional network structure densely packed, peeling and wear are difficult to occur on rotating and sliding of the constitutional elements of the rolling bearing 16.

Figure 7:
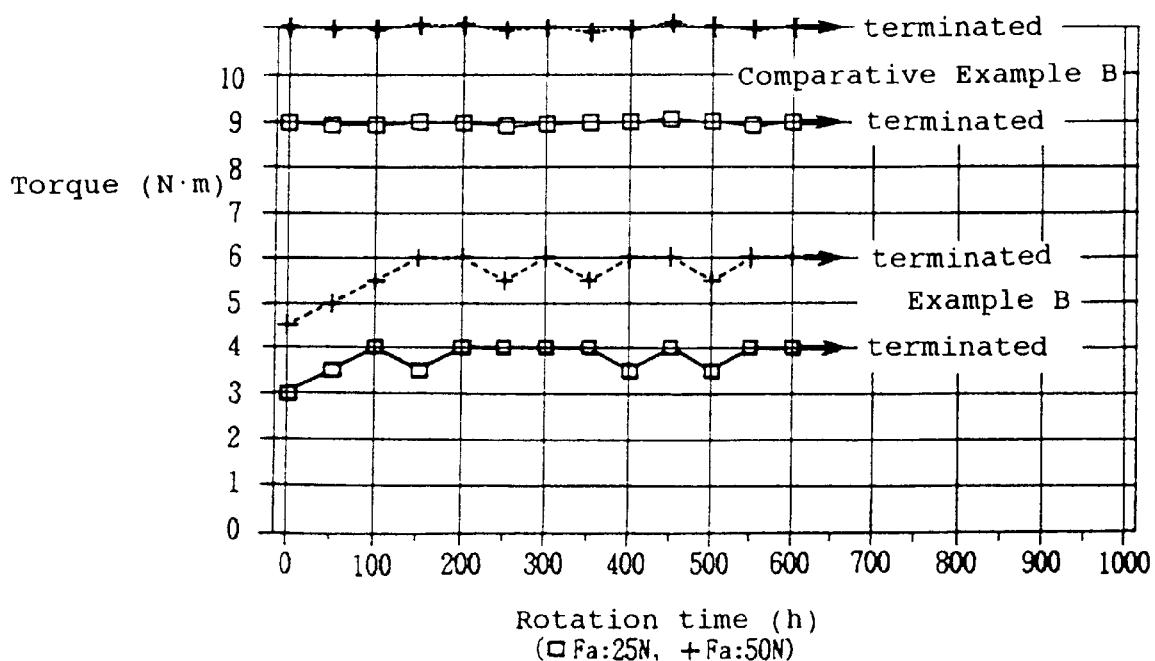
FIG. 7 is a graph showing test results of the torque life of the bearing under an atmospheric environment.

B-(2) In the torque life test, the atmosphere is vacuum, the environmental temperature is room temperature, and the axial load is 25 N or 50 N. Example B and Comparative Example B are measured herein. As shown in the graph of FIG. 7, in Example B, while the measurement is terminated at 600 hours, it can be reduced in that the torque is from $3\times10^{-3}$ to $4\times10^{-3}$ N·m for an axial load of 25 N, and the torque is from $5\times10^{-3}$ to $6\times10^{-3}$ N·m for an axial load of 50N, but in Comparative Example B, the torque is from $9\times10^{-3}$ N·m for an axial load of 25 N, and the torque is from $11\times10^{-3}$ N·m for an axial load of 50N. As shown herein, the torque of Example B can be certainly reduced to about half of Comparative Example B.

In the case where the atmosphere is vacuum, the environmental temperature is a high temperature (200° C.), and the axial load is 50 N, as shown in FIG. 12 (in which the ordinate shows the torque, and the abscissa shows the rotation time), the torque becomes extremely large at 10 hours in Comparative Example B, whereas in Example B, no problem occurs after 90 hours. Accordingly, the torque life reveals the remarkably excellent result in comparison to Comparative Example B irrespective to the ups and downs of the atmospheric temperature.

Accordingly, it is considered that because the component added to the base component is not bonded thereto, the component added has fluidity to exhibit a lubricating function, and it contributes to the reduction in torque.

As the film 27, in addition to those described above, one obtained by using the fluorine-containing polymer having a functional group with the ends being an isocyanate (FONBLIN Z Derivative (FONBLIN Z DISOC), in which the concentration is 1 mass %, one obtained by adding a fluorine-containing polymer having a functional group with the ends being a hydroxyl group (—OH) (FONBLIN Z Derivative (FONBLIN Z DOL) to a fluorine-containing polymer having a functional group with the ends being an isocyanate (FONBLIN Z Derivative (FONBLIN Z DISOC), in which the concentration of the FONBLIN Z Derivative (FONBLIN Z DISOC) is 1 mass %, and the concentration of the FONBLIN Z Derivative (FONBLIN Z DOL) is 0.25 mass %, and one obtained by adding a fluorine-containing polymer having a functional group with the ends being a hydroxyl group (—OH) (FONBLIN Z Derivative (FONBLIN Z DOL) and a fluorine-containing polymer having no functional group (FONBLIN Z Derivative (FONBLIN Z-60) to a fluorine-containing polymer having a functional group with the ends being an isocyanate (FONBLIN Z Derivative (FONBLIN Z DISOC), in which the concentration of the FONBLIN Z Derivative (FONBLIN Z DISOC) is 1 mass %, and the total concentration of the FONBLIN Z Derivative (FONBLIN Z DOL) and the FONBLIN Z Derivative (FONBLIN Z-60) is 0.25 mass % may be used.

The invention is not limited to the embodiments described above, but various applications and modifications may be considered.

(1) The information equipment of the invention maybe, in addition to the hard disk drive device described above, a device having a precision rotating mechanism.

(2) While a deep groove ball bearing is used as the rolling bearing 16 for supporting the swing arm of the movement unit 5 in the embodiments described above, other various rolling bearings may be used.

(3) While the film 27 is formed in the rolling bearing 16 for supporting the swing arm of the movement unit 5 in the embodiments described above, the film 27 may also be formed in the rolling bearing 7 of the spindle unit 3 in the similar manner. In this case, it can contribute to the improvement in rotation precision of the disk 2 for recording information.

(4) In the hardening treatment (B-c) in the embodiments described above, an energy of an electromagnetic wave (light), such as an ultraviolet ray, an infrared ray, a γ-ray, an electron beam and the like, may be used instead of the heating. The drying treatment (B-b) may be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information equipment comprising:

a rocking mechanism for rocking an element of said equipment, and a rolling bearing for supporting said rocking mechanism, wherein said rolling bearing has, on at least a race surface thereof, a film comprising a fluorine-containing polymer having a functional group formed under a state having fluidity, and a thickness thereof is set at 0.2 $\mu$m or less; and wherein recording/reproduction of information is conducted to a disk for recording information having, on a surface thereof, a protective film of the same composition of said film.

2. An information equipment described in claim 1, wherein said rolling bearing has said film formed at least one race surfaces of an inner race and an outer race.

3. An information equipment described in claim 1, wherein said functional group has high affinity to a metal.

4. An information equipment described in claim 1, wherein said fluorine-containing polymer is a fluoropolyether polymer.

5. An information equipment described in claim 1, wherein said fluorine-containing polymer is a polyfluoroalkyl polymer.

6. An information equipment comprising:

a rotating mechanism for rotating an element of said equipment, and a rolling bearing for supporting said rotating mechanism, wherein said rolling bearing has, on at least a race surface thereof, a film comprising a fluorine-containing polymer having a functional group formed under a state having fluidity, and a thickness thereof is set at 0.2 $\mu$m or less; and wherein recording/reproduction of information is conducted to a disk for recording information having, on a surface thereof, a protective film of the same composition of said film.

7. An information equipment comprising a head for recording/reproduction for conducting recording/reproduction of information to a disk for recording information, a rocking mechanism for moving said head by rocking, and a rolling/bearing for supporting said rocking mechanism, wherein said rolling bearing has, on at least on a race surface thereof, a film, of the same composition as a protective film on a surface of said disk for recording information, formed under a solid state, and said film comprises a fluorine-containing polymer having a functional group, and a film thickness thereof is set at 0.2 $\mu$m or less.

8. An information equipment comprising:

a rocking mechanism for rocking an element of said equipment, and a rolling bearing for supporting said rocking mechanism, wherein said rolling bearing has, on at least a race surface thereof, a solid film comprising a fluorine-containing polyurethane polymer compound; and wherein recording/reproduction of information is conducted to a disk for recording information having, on a surface thereof, a protective film of the same composition of the said solid film.

9. An information equipment described in claim 8, wherein said rolling bearing has said film formed at least one race surfaces of an inner race and an outer race.

10. An information equipment described in claim 8, wherein said fluorine-containing polyurethane polymer compound has a three-dimensional network structure.

11. An information equipment described in claim 8, wherein a fluorine-containing polymer compound having fluidity is added to said fluorine-containing polyurethane polymer.

12. An information equipment comprising:

a rotating mechanism for rotating an element of said equipment, and a rolling bearing for supporting said rotating mechanism, wherein said rolling bearing has, on at least a race surface thereof, a solid film comprising a fluorine-containing polyurethane polymer compound; and wherein recording/reproduction of information is conducted to a disk for recording information having, on a surface thereof; a protective film of the same composite of said solid film.

13. An information equipment comprising a head for recording/reproduction for conducting recording/reproduction of information to a disk for recording information, a rocking mechanism for moving said head by rocking, and a rolling bearing for supporting said rocking mechanism, wherein said rolling bearing has, on at least on a race surface thereof, a film of, the same composition as a protective film on a surface of said disk for recording information, formed under a solid state, and said film comprises a fluorine-containing polyurethane polymer compound.

* * * * *